United States Patent
Fantoni

[11] 3,719,977
[45] March 13, 1973

[54] AUTOMATIC TOOL CHANGING DEVICE FOR A MACHINE TOOL

[75] Inventor: Giuseppe Fantoni, Ivrea, Italy

[73] Assignee: Ing. C. Olivetti & Co., S.p.A., Ivrea, Italy

[22] Filed: April 29, 1970

[21] Appl. No.: 32,811

[30] Foreign Application Priority Data

April 30, 1969 Italy.................51649 A/69

[52] U.S. Cl.................29/26 A, 29/568, 408/35, 318/601
[51] Int. Cl..............................B23f 3/157
[58] Field of Search............29/568, 26 A; 77/71, 25; 408/35; 318/601, 602

[56] References Cited

UNITED STATES PATENTS

| 3,292,235 | 12/1966 | Riedel | 29/26 |
| 3,473,419 | 10/1969 | Ollearo | 29/26 X |
| 2,783,664 | 3/1957 | Johnson | 408/35 |
| 3,225,439 | 12/1965 | Perry et al. | 29/568 |
| 2,956,454 | 10/1960 | Hansen | 408/35 |
| 3,263,300 | 8/1966 | Schatzman et al. | 29/26 |
| 3,276,116 | 10/1966 | Stark | 29/568 |
| 2,823,344 | 2/1958 | Ragland | 318/601 X |
| 2,989,680 | 6/1961 | Weiser et al. | 318/601 |
| 3,448,360 | 6/1969 | Pohl | 318/601 |
| 3,465,217 | 9/1969 | Kress | 318/601 |

Primary Examiner—Andrew R. Juhasz
Assistant Examiner—Z. R. Bilinsky
Attorney—Birch, Swindler, McKie & Beckett

[57] ABSTRACT

An automatic tool changing device for aligning a selected tool accurately with a headstock spindle. A rotatable drum has a plurality of tool holding positions and a locating rod adjacent to and axially aligned with each of the tool holding positions. An electric motor with an electromagnetic brake rotates the drum to substantially properly align a selected tool. The drum is laterally movable on a support mounted on the headstock between a first position in which the selected tool is spaced axially from the headstock spindle but substantially aligned therewith, and a second position in which said tool engages the spindle. A tapered aligning opening on the headstock receives the locating pin associated with the selected tool as the drum is moved laterally to rotate the drum slightly, if necessary, to precisely align the tool as it engages the spindle.

8 Claims, 6 Drawing Figures

INVENTOR
GIUSEPPE FANTONI
BY Birch, Swindler, McKie & Beckett
ATTORNEYS

AUTOMATIC TOOL CHANGING DEVICE FOR A MACHINE TOOL

BACKGROUND OF THE INVENTION

1. Field of the Invention

This invention relates to an automatic tool changing device for a machine tool, of the kind provided with a revolving tool-holding drum adapted to bring the selected tool in correspondence with the spindle of the headstock of the machine and to mount the tool thereon.

2. Description of the Prior Art

Machine tools of various kinds are already known, wherein it is possible to change the tools automatically, such machines being provided with a headstock and a revolving drum of frusto-conical shape which carries a plurality of tools on its tapering surface. The apex angle of the cone of the drum and the inclination of the axis of rotation of the latter with respect to the axis of the machine spindle are such as to cause the axis of the tool, which is brought in correspondence with the spindle, to coincide with the axis of the latter. In order to mount each tool on the headstock spindle, it is further necessary to move this spindle and the tool longitudinally relative to each other. In known devices, this movement is accomplished in two basically different ways. In one manner, the tool-holding drum is stationary with respect to the headstock and the longitudinal movement is imparted to the spindle; in a second manner, the spindle is stationary relative to the headstock and the drum is displaced lengthwise with respect to the headstock.

In the devices according to the prior art, the rotational movement of the tool-holding drum is accomplished either by means of a worm wheel and worm gear, the worm wheel being integral with the drum, while the worm gear is driven via gearings of various kind by an electric motor, or by means of a ratchet gear keyed to the drum, and a ratchet pawl actuated by a hydraulic cylinder.

The relative movement of the spindle with respect to the headstock is accomplished either mechanically, i.e., by means of cams actuated via gears by an electric motor (in the case when the spindle is movable whilst the drum is stationary relative to the headstock), or by means of a hydraulic cylinder whose axially movable piston is integral with the drum (in the case when, instead, the spindle is stationary relative to the headstock while the drum is movable).

In known machine tools, the various tools carried by the drum are normally secured thereto either by means of a pair of locking jaws or by mechanical adapters of various kinds.

Known automatic tool changing devices are not free from some disadvantages. First of all, the devices for attaining the relative longitudinal movement of the drum with respect to the spindle either are highly complicated and therefore delicate and expensive, or they do not permit a sufficiently smooth and regular relative movement to be attained, particularly at the ends of the traverse strokes, chiefly on account of the high accelerations (and, therefore, of the high inertia forces) generated at the ends of the strokes.

Moreover, the devices utilized for imparting the movement of rotation to the drum either are themselves excessively complicated or will not yield, in general, an angular positioning of the drum which is accurate enough i.e., such as to realize a perfect coaxiality of the tool, to be secured to the spindle, with the axis of the latter. Further, known devices are apt to give rise to rather abrupt movements of rotation, owing to the particular behavior of the angular velocity of the drum as a function of the angle of rotation of the latter.

SUMMARY OF THE INVENTION

According to the present invention there is provided an automatic tool changing device comprising a tool holding drum which is rotatable to align a selected tool with a headstock spindle and means for moving the drum parallel to the spindle axis to offer the selected tool to the spindle, an electric motor provided with an electromagnetic brake for rotating the drum to and braking the drum at a position in which the selected tool is approximately aligned, and means for effecting a subsequent rotation of the drum so as to align the selected tool accurately.

DESCRIPTION OF THE PREFERRED EMBODIMENT

Figure 1:
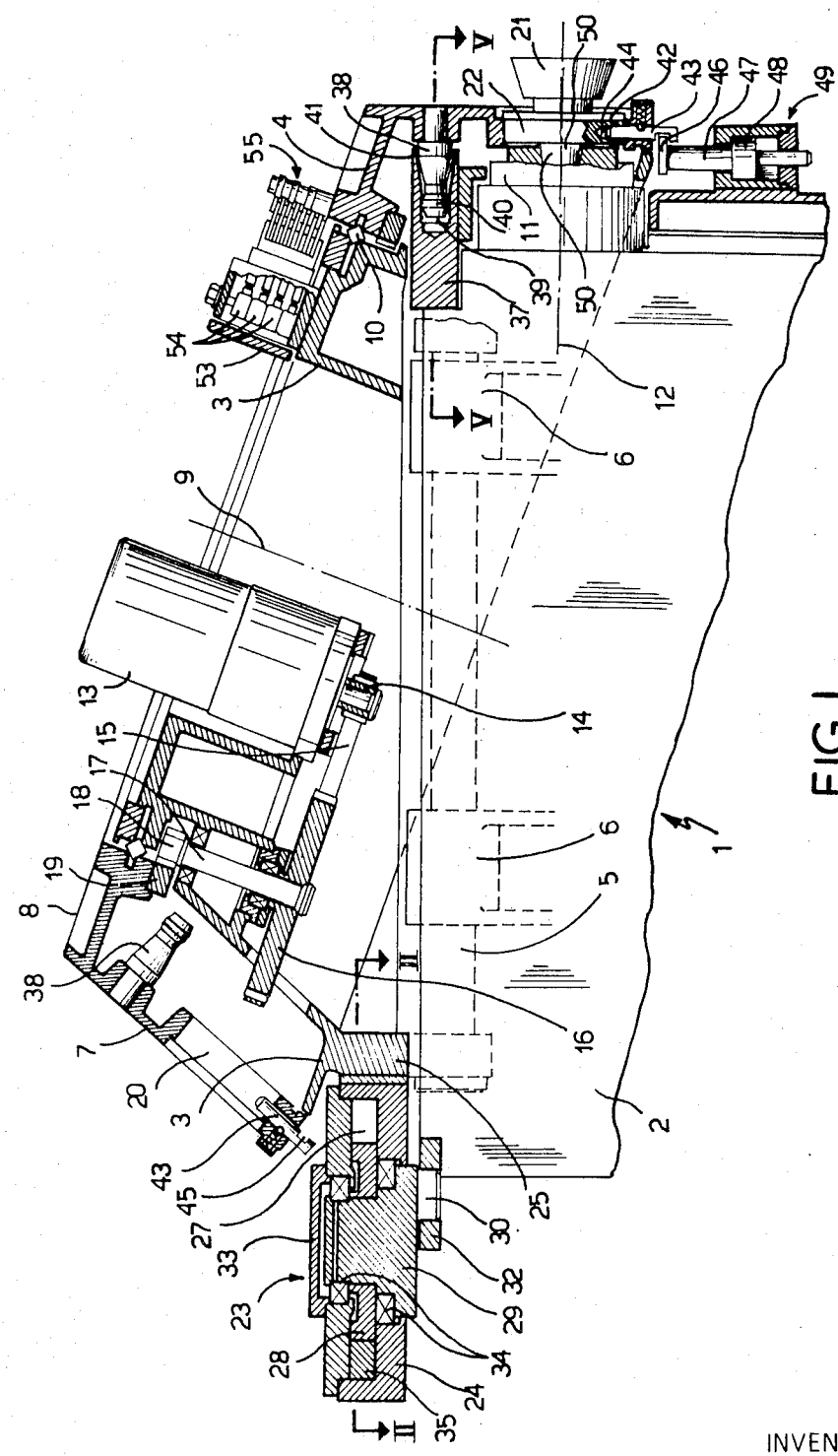
FIG. 1 is a partial longitudinal section of the tool changing device embodying the present invention.

With reference to FIG. 1, the headstock for a machine tool, generally designated by the reference numeral 1, and only a part of which is shown in said figure, comprises a casing 2 on which a support 3 carrying a tool-holding drum 4 is adapted to slide lengthwise, in any suitable manner, suitable for instance by providing columns 5 sliding in stationary sleeves 6.

The drum 4 is of substantially frusto-conical shape, being defined laterally by a tapering wall 7 and by a ring-shaped surface 8 at the top. The drum 4 can rotate about its axis of rotation 9, being supported by a set of rollers 10 housed in annular seats provided in the support 3 and in the drum itself.

The casing 2 also supports a tool spindle 11 whose axis of rotation 12 is horizontal and parallel to the direction of movement of the tool-holding drum 4 with respect to the casing 2. The angle formed by the generating line of the surface of the conical side wall 7 of the drum 4 with the axis of rotation 9 of the drum and the angle formed by the axis 9 with the axis of rotation 12 of the spindle 11 are complementary to one another, whereby the generating line of the surface of the conical wall 7 which intersects the axis 12 will be at right angles with the latter. Thus, the support 3 is so shaped as to enable the drum 4 to take the relative position described above, with respect to the casing 2.

To the support 3 there is fastened an electric motor 13 which through a pinion 14, a toothed belt 15 and a gear wheel 16, drives a shaft 17 integral with an end pinion 18 which meshes with an internal gear 19 integral with the drum 4. The electric motor 13 is of the reversible type and is provided with a brake. Therefore, by means of the motor it is possible to cause the tool-holding drum 4 to rotate in the direction desired and to arrest the drum in a predetermined angular position.

The tapering side wall 7 of the tool-holding drum 4 is provided with a plurality of holes 20 of large diameter; inside each of these holes is housed a tool 21, which is integral with a corresponding tool-holding disk 22. The relative position of the drum 4 with respect to the spindle 11 is such that, during rotation of the drum, it is possible to bring the axes of each hole 20 (and hence of each tool 21) in coincidence with the axis of said spindle.

Figure 2:
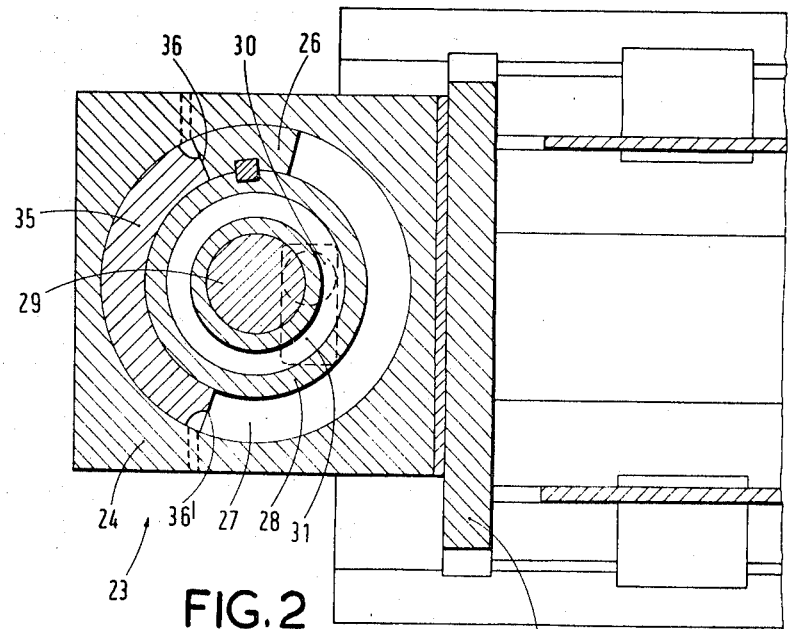
FIG. 2 is a partial section generally taken along lines II—II of FIG. 1, showing a hydraulic device driving the tool-holding drum in its longitudinal displacement with respect to the headstock, in the end-of-stroke position to which fastening of a tool on the headstock spindle corresponds.
Figure 3:
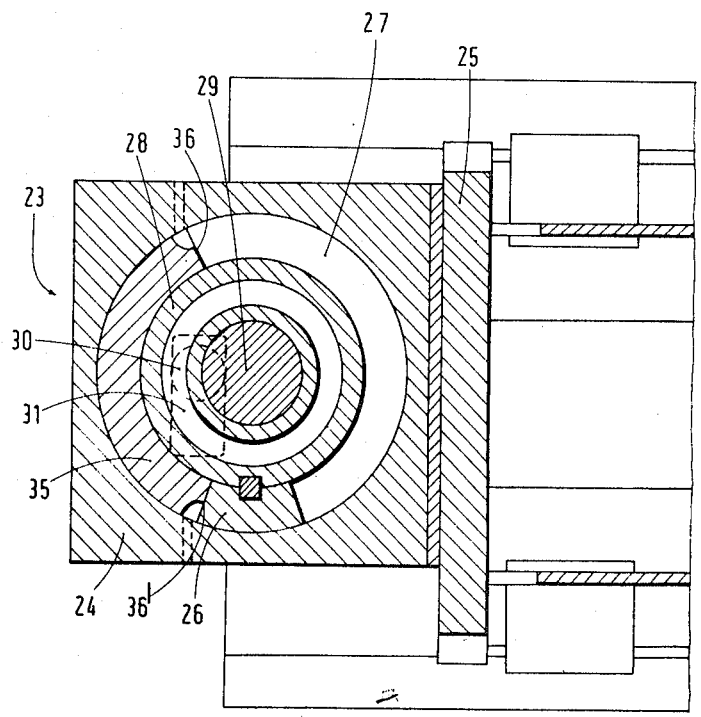
FIG. 3 shows a section similar to that of FIG. 2, wherein the hydraulic control device is in the end-of-stroke position opposite to that shown in the preceding figure, and to which release of the tool from the headstock spindle corresponds.

For traversing the drum 4 in the horizontal direction parallel to the axis 12 of the spindle 11, a hydraulic device 23 is provided, (FIGS. 1, 2 and 3). This device comprises a housing or casing 24, approximately square in plan. At one end — as seen in the right-hand side of FIG. 1 — the housing 24 is integral with a projection 25 of the support 3. A rotary piston 26 (FIGS. 2 and 3) having the shape of a sector of an annulus is slidable rotationally in a corresponding cylindrical chamber 27. The piston 26 is integrally connected, by means of a key, with a disk 28 which is fastened, in turn, to a shaft 29 (FIG. 1) provided, at its underside, with an eccentric pin 30 housed in a slot 31 of substantially rectangular shape, which is formed in a plate 32 integral with the casing 2 of the headstock.

The shaft 29, which is adapted to rotate with respect to the housing 24, is supported therein in a pair of bearings 34 and covered at the top by a cover plate 33. Inside the housing 24 a stationary sector 35 is provided, whose end walls, 36 and 36' respectively, serve the purpose of limiting the stroke of the piston 26 in both directions. By feeding oil under pressure into the chamber comprised between the wall 36 of the stationary member 35 and the corresponding wall of the rotary piston 26, the latter will be caused to rotate by about 180° around the axis of the shaft 29, thereby urging the opposite face of the piston to come into contact with the end fact 36' of the stationary member. During this rotational movement, the pin 30 will also rotate about 180° around the axis of the shaft 29 but, being constrained in the slot 31 provided in the plate 32 integral with the casing 2, it will urge the housing 24 of the hydraulic device 23 to move axially relative to the casing. FIGS. 2 and 3 show, respectively, the positions taken by the housing 24 in correspondence with the two aforementioned positions at the end of the stroke of the piston 26 in either direction.

The tool changing device is further provided with a centering device comprising a locating member 37, which is fastened to the casing 2 and whose axis lies in the same vertical plane as the axis 12 of the spindle 11, and a plurality of locating pins 38, each of which is fastened to the inner surface of the drum 4 in correspondence with a tool 21, so that the axis of each pin 38 will lie in the same radial plane as that of the corresponding tool 21.

The locating member 37 comprises a cylindrical hole 39 adapted for housing the head 40 of one of said pins 38, as well as a tapered guide hole 41. The locating pins 38 and locating member 37 serve the purpose of accurately positioning angularly the drum 4 relative to the spindle 11, during the axial movement (leftward, as seen in FIG. 1) of the drum with respect to the spindle 11 and after removal of the braking action exerted by the electric motor 13, so as to enable the drum to perform small angular rotations.

Each tool 21 is mounted in the corresponding hole 20 of the tool-holding drum 4 by inserting its tool-holding disk 22 inside the hole and by causing an annular ridge 42 of the disk 22 to abut against a corresponding annular ridge of the hole 20. In order to stably maintain the tools 21 in this assembling position, in the wall 7 of the drum a number of locking pins 43 is provided, which are radially movable with respect to the tool-holding disks 22 and are adapted to be inserted into radial holes 44 formed in the disks.

Upon completion of an operation performed with one of the tools 21, the radial hole 44 of the tool-holding disk 22 will be disposed with its axis in exact coincidence with that of the corresponding locking pin 43, by bring again the spindle 11 in the same angular position with respect to the casing 2 of the operating head utilizing the angular alignment device described in the specification of our Italian Pat. No. 808,399.

Further, each locking pin 43 is provided with a U-shaped slot 45, (FIG. 4) which is constantly maintained directed towards the axis of the tool-holding drum and is adapted for cooperating with the cylindrical head 46 of a rod 47 integral with the piston 48 of a hydraulic cylinder 49 fastened to the casing 2 of the operating head and disposed directly beneath the spindle 11. As shown in FIG. 1, the U-shaped slot of the pin 43 which locks the tool-holding disk 22 of the tool 21 disposed in correspondence with the spindle, is adapted to cooperate with the cylindrical head 46 and, therefore, by feeding oil into the cylinder 49, it will be possible to axially displace downwards, as seen in FIG. 1, the piston 48, thereby withdrawing the locking pin 43 to release the tool-holding disk 22. When the pin 43 is subsequently reinserted by the piston 48 it is held in by a spring-loaded detent visible in FIG. 4.

In order to rotate the selected tool 21, when this has been mounted on the spindle 11. tapered shank 50 on the tool-holding disk 22 and one or more small dogs 51 (FIG. 4) on the front face of the spindle 11 are provided, which cooperate with corresponding recesses 52 formed in the tool-holding disks 22, as known per se. It is also possible to provide other suitable means or device for entraining in rotation the tool 21.

In order to actuate the electric motor 13, seven microswitches 54 (only four of which are shown in FIG. 1) are disposed in a box 53 secured to the support 3;

each of these microswitches is adapted to cooperate with one of seven corresponding cams 55, carried by a rod integral with the drum 4. One set of cams 55 is disposed in correspondence with each tool.

Further, in order to choose - for each position of the tool-holding drum 4 — the appropriate direction of rotation of the drum for bringing in position a desired tool on the spindle 11 by following the shortest path, it is simply necessary to compare, in a manner to be described hereinafter, the values of numbers A and R indicating, respectively, the actual position of the drum and that required by a given program recorded, for instance, on a tape.

The number of the tools carried by the drum 4 in one embodiment is 20; let us assume that the positions of the tools on the drum are designated by increasing numbers (from 1 to 20), for instance increasing in counterclock wise direction on the drum 4, as viewed from above. The numbers A and R are expressed in a binary coded decimal code (B C D). To indicate the numbers up to 19 a capacity of five binary digits is necessary, but for indicating the number 20 (10; 0000) a capacity of six digits would be required. However, the number 20 can be represented by zero, requiring five binary digits only whereby it is possible to utilize only five microswitches cooperating with corresponding cams so as to define, in the aforementioned code, the position of each of the 20 tools.

To effect the above comparison between A and R, after calculating with arithmetical operations — in a binary system — the sum $X = A + \overline{R}$, i.e., A plus the complement of R, it will be sufficient to verify whether the fifth binary digit of X thus obtained is "0" or "1." In fact, it can be easily demonstrated that the required direction of revolution of the drum 4, following the shortest path is, with the convention adopted, anticlockwise and clockwise respectively when the fifth binary digit of X is "0" or "1" respectively. It is sufficient to carry out this verification without any need of determining the complete result of the sum $A + \overline{R}$, thereby considerably simplifying the circuitry of the adder device provided for determining the value of X.

Therefore, five of the seven microswitches 54 are adapted for detecting the five bits which distinguish the position of the drum whilst, of the remaining two, one provides a strobing bit (which, as it known, gives a reading assent signal) and the other provides a parity bit (which, as is also known, enables the coded information read from the cams 55 to be checked.)

Figure 6:
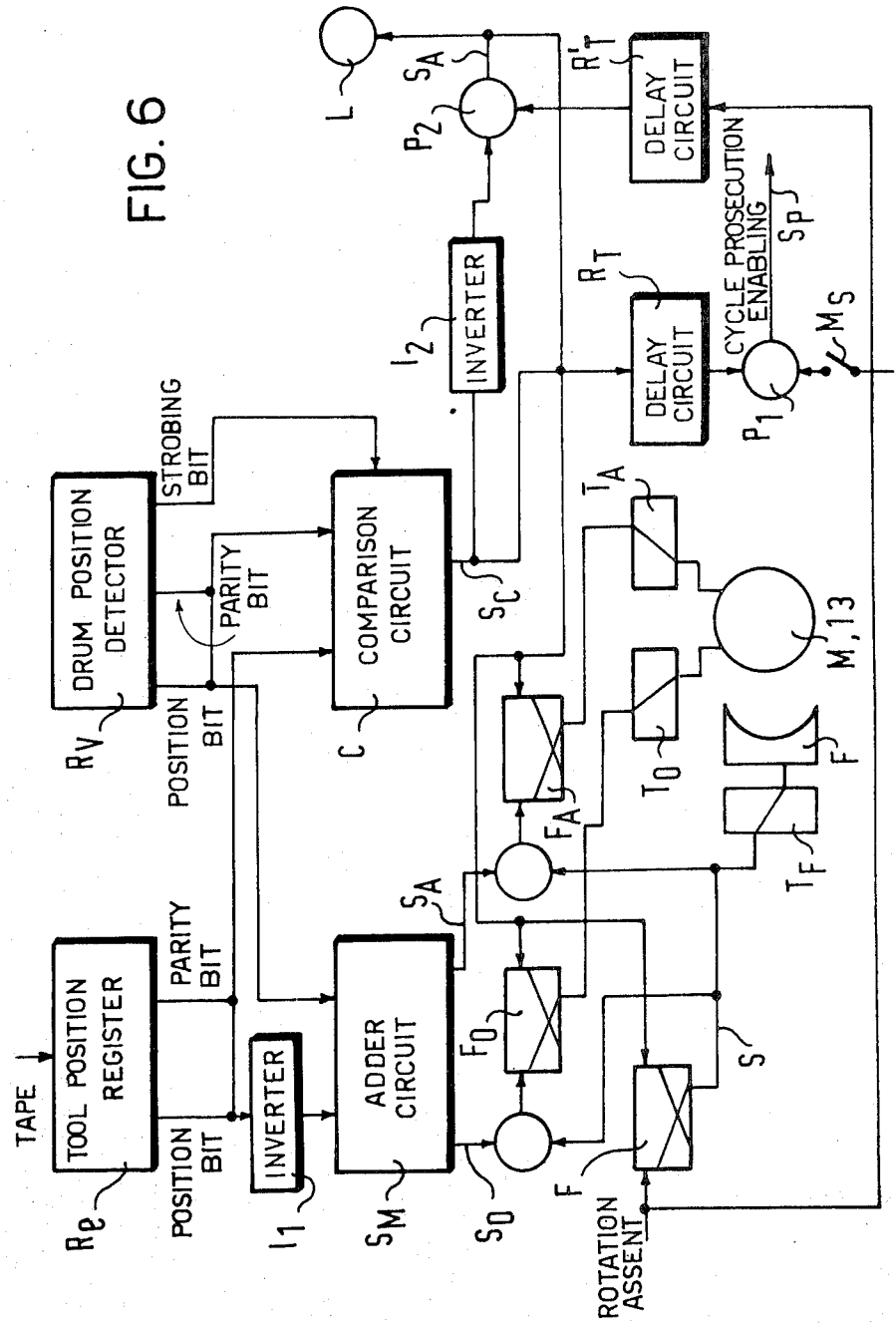
FIG. 6 shows the electric control circuitry of the tool changing device.

FIG. 6 shows the control circuitry for the device. This comprises a register for the tool position $R_e$, which contains the data read, for instance from a punched tape, identifying the tool to be changed, and a detector $R_v$ for the signals from the seven microswitches 54 associated to the corresponding cams 55.

The five bits indicating the position of the drum 4 and the two other bits, namely the parity and the strobing bit, are fed to a comparison circuit C, to which are also sent, from the register $R_e$, the five bits of the program together with the corresponding parity bit. The comparison circuit C compares the bits of $R_e$ with those of $R_v$ and, when coincidence exists, it will emit a coincidence signals $S_c$.

The five position bits (corresponding to the aforementioned number of R which gives, in a binary code, the required position of the drum) are fed from $R_e$ to an inverter $I_1$, which provides the complement of R, $\overline{R}$, and from the latter to an adder circuit $S_m$, to which are also fed the five position bits detected by $R_v$ (corresponding to the number A which gives, in a binary code, the actual position of the drum); this adder circuit will effect the sum $X = A + \overline{R}$ whose result, in the manner described above, produces a signal of rotation of said drum in clockwise or anticlockwise direction, $S_O$ and $S_A$, respectively.

Each of said signals $S_O$, $S_A$ will set either of two flip-flops $F_O$, $F_A$ in presence of a signal of assent S emitted by a flip-flop F, which is in turn set by a signal generated by the sequence of the machine cycle. Each flip-flop $F_O$, $F_A$ can energize a corresponding remote control switch, $T_O$ or $T_A$ respectively, which causes the motor M, 13 to rotate in a predetermined direction; the signal S, emitted by the flip-flop F, will also energize a remote control switch $T_F$, which releases the brake F of the motor M.

When the comparison circuit emits a coincidence signal $S_C$, the flip-flops $F_O$, $F_A$ and F will be reset, with consequent stopping and braking of the motor M.

Figure 5:
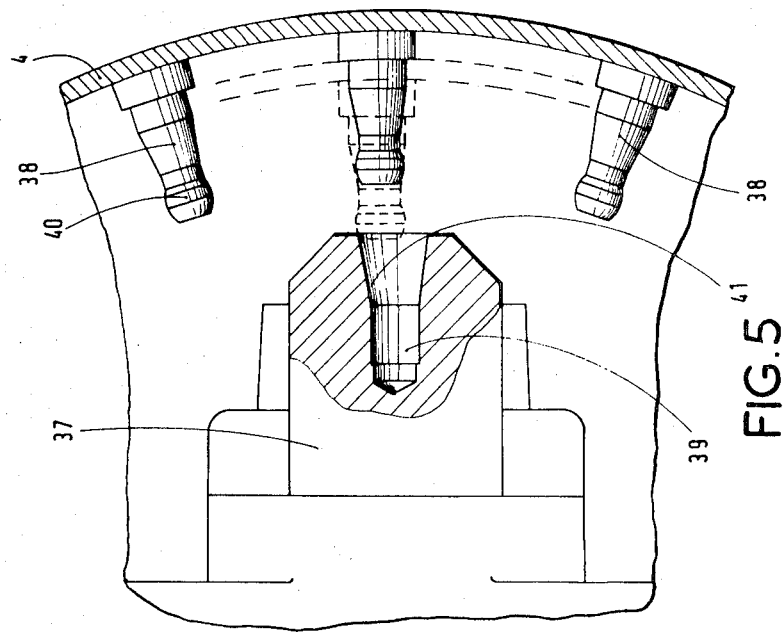
FIG. 5 is a partial section of the headstock, generally taken along lines V—V of FIG. 1, showing in particular the action exerted by a device for centering the tool-holding drum.

The same signal $S_C$ which, through a delay circuit $R_t$, reaches the gate $P_1$, in the presence of another signal emitted by a microswitch $M_S$ for monitoring the position of the drum 4, will enable the prosecution of the cycle by means of a signal $S_p$. The delay circuit $R_t$ is necessary in order not to start the prosecution of the cycle (traverse of the drum and centering of the same) simultaneously with the completion of the movement of rotation, while the monitoring microswitch $M_S$ has the purpose of checking whether the coarse positioning of the drum — which is accomplished by means of the motor 13, as will be described hereinafter — has been effected with an angular tolerance such as to enable the head 40 (FIG. 5) of the locating pin 38 to be inserted into the tapered hole 41 of the locating member 37, after completion of the traverse movement of the drum 4. The microswitch $M_s$ can be mounted on the stationary support 3, in a position such as to permit actuation thereof by a corresponding operating member carried by the drum and which can be coincident, or not, with the cams 55. Most suitably, the monitoring microswitch is placed at an angular distance, from the spindle 11, corresponding to two steps of the drum and is actuated by the strobing cam 55.

The rotation assent signal entering the flip-flop F (FIG. 6) is simultaneously fed, through a delay circuit $R_t'$ (with a delay, for instance, of ten steps, corresponding to a rotation of 180 degrees of the drum 4), to a gate $P_2$, which is also reached by a signal generated by an inverter $I_2$ that receives the signal $S_C$.

In the absence of the coincidence signal $S_C$ for a period corresponding to 10 steps, the gate $P_2$ will thus emit a stop signal $S_A$, which locks the controls of the headstock and gives a warning of this locking of the controls by means of a lamp L. This provides a safety in the case of recording errors or of failure of some elements of the circuit, as for instance one of the microswitches 54.

The operation of the tool changing device is as follows.

Let us first assume that the drum 4 is in the position corresponding to the completion of a process effected with a tool 21 (FIG. 1) and that other tools have been mounted in the various holes of the drum. These tools will have been mounted manually on the drum, by first pulling out the locking pins 43, in order to permit the introduction of the tool-holding disks 22, and subsequently snapping the pins into the holes 44 provided in the disks 22. The tool-holding disk 22 of the tool 21 mounted on the spindle 11 is released from the corresponding locking pin 43, because the latter has been withdrawn downwards as seen in FIG. 1 by the cylindrical head 46 integral with the piston 48 of the hydraulic cylinder 49 and coupled with the U-shaped slot 45 provided in the pin.

Starting from the position thus defined, to begin the tool changing operation, the hydraulic cylinder 49 will be actuated first, thereby bringing the cylindrical head 46 into the position shown in FIG. 1, so that the pin 43 is inserted in the corresponding hole 44 in the tool-holding disk 22. Inasmuch as the spindle 11 is provided with the angular alignment device (which is described in the aforementioned specification) when the pin 43 is to be inserted into the hole 44, the axis of the latter will be coincident with that of the pin. With this operation, the tool will be firmly locked to the drum 4.

Figure 4:
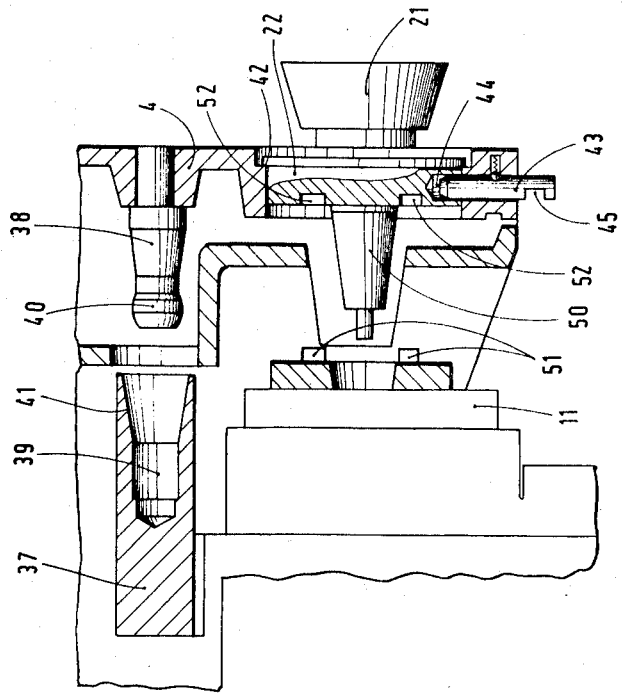
FIG. 4 is a partial section similar to that of FIG. 1, showing the headstock in the position in which the tool is fully released from the head spindle.

Subsequently, by feeding oil through the ducts of the hydraulic device 23, the rotary piston 26 will be caused to rotate in clockwise direction, moving from the position shown in FIG. 2 to that shown in FIG. 3. To this rotational movement of the piston 26 will correspond an axial displacement of the housing 24 to the right and, consequently, a displacement of the tool-holding drum 4 in the same direction. As a result, the tool 21 and the corresponding tool-holding disk 22 will be released from the spindle 11; the position taken by these members, relative to the spindle, is than as shown in FIG. 4.

Thereupon, the rotation of the drum 4 is started, during which is accomplished the automatic selection of the particular tool desired by following the shortest path, as described above.

The rotation of said drum takes place in the direction established by the signal emitted by the adder circuit $S_m$ (FIG. 6), in the manner previously described. When the comparison circuit C emits a coincidence signal $S_C$, the motor M, 13 will be arrested and braked; as a result, the tool-holding drum will take an angular position roughly corresponding to the ultimate one, bit the position of the axis of the tool selected will not in general be exactly coincident with that of the spindle axis.

As soon as the gate $P_1$ has emitted the signal $S_p$ of "cycle prosecution," the hydraulic device 23 (FIGS. 1, 2 and 3) is brought into operation, whereby the rotary piston 26 will be caused to rotate in counterclockwise direction; as a result, the drum 4 will be displaced to the left, as seen in FIG. 1, thereby starting the return stroke of the drum. In a predetermined point of the return stroke of the drum 4, the latter will actuate a microswitch (not shown), which applies to the remote control switch $T_F$ (FIG. 6) of the electric motor M, 13 a signal that removes the braking action exerted by the latter. In another point of the return stroke of said drum 4, immediately next to that mentioned above, the locating pin 38 (FIG. 5), which is in correspondence with the selected tool, will come into contact with the locating member 37. The head 40 of the locating pin 38 will, first of all, coact with the conical surface of the tapered hole 41, thereby causing a slight angular rotation of the drum 4 (which, being free as set forth above, may vary its angular position), so as to completely insert the locating pin 38 into the cylindrical hole 29 of the locating member 37, as shown in FIG. 1, with the ultimate result of positioning, with considerable accuracy, the tool-holding drum 4 with respect to the spindle 11.

At the end of the return stroke of the drum 4, besides complete centering of the drum with respect to the spindle, a firm locking of the tool 21 (FIG. 4) on the spindle is also obtained, by virtue of both the coupling of the tapered shank 50 with the corresponding conical recess of the spindle and of the insertion of the dogs 51 into the corresponding recesses 52 provided in the tool-holding disk 22.

Upon completion of the rotation and of the lengthwise return movement of the drum 4, which have mounted the newly selected tool on the spindle 11 (FIG. 1), the U-shaped slot of the locking pin 43, associated with the selected tool, will take the position shown in FIG. 1, i.e., wherein the slot is coupled with the cylindrical head 46 of the shank 47. By actuating the hydraulic cylinder 49, it will be possible to withdraw the pin 43 from the corresponding hole 44 in the tool-holding disk 22, thereby enabling the tool to be rotated by the spindle 11.

Many modifications to the described embodiment are obviously possible. We mention that, through a headstock with a horizontal spindle has been described, a headstock may also be utilized with a spindle disposed vertically or inclined with respect to the machine tool.

It is to be understood that the invention is not to be limited to the specific form or arrangement of parts herein described and shown, but is limited only by the scope of the appended claims.

I claim:

1. An automatic tool changing device for a machine tool having a machine frame and a headstock spindle comprising:
    a rotatable tool holding drum having a side wall in which are a plurality of spaced tool holding positions for holding a plurality of tools adapted to engage said headstock spindle, said drum being so positioned with respect to said headstock spindle as to present upon rotational movement of said drum a selected tool to said headstock spindle axially spaced from said headstock spindle but in substantially proper alignment for engagement therewith,
    means for rotating said drum to being said selected tool substantially in proper alignment with said headstock spindle,
    a drum support mounted on said headstock, said drum support being laterally movable between a first position in which said selected tool is spaced axially from said headstock spindle and a second position in which said tool engages said headstock spindle,
    a plurality of locating pins affixed to said wall of said drum, each of said locating pins being associated with one of said tool positions and having a portion of a predetermined diameter, and a conical opening on said frame, said conical opening leading to a cylindrical chamber having said predetermined diameter and an axis parallel to the axis of said spindle for receiving said locating pins when said drum is moved laterally to said second position, whereby said locating pins engage said conical opening to effect a subsequent rotation of said frum to align said selected tool accurately to said headstock spindle.

2. A device according to claim 1 wherein said drum support is moved laterally parallel to the axis of said spindle by a hydraulic motor connected between said tool support and said headstock, said hydraulic motor comprising a hydraulic cylinder and a rotary piston operating in said cylinder and having an eccentric pin operating in a slot to impart linear movement to said support.

3. A device according to claim 2 wherein each of said tool holding positions comprises an opening in said side wall and said tools are mounted upon discs which are received by said openings and held therein by pins radially inserted into openings in said discs, said device further comprising a hydraulic motor mounted on said headstock and having a piston rod acting upon said pins when said support is in said second position to withdraw or insert said pins from said selected tool to respectively free said tool for rotation with said spindle and lock said tool to said disc.

4. A device according to claim 1, wherein said means for rotating include an electric motor operable for driving said drum in rotation and an electromagnet brake for braking said drum when said selected tool is substantially in proper alignment with said head stock spindle.

5. A device according to claim 4, wherein said electric motor is reversible, comprising a control circuit for said electric motor for selecting the direction of rotation of said drum which will align said selected tool by the shortest path, said control circuit including means responsive to binary coded number A + R representing respectively the actual position of said drum and the required position of said drum to form the most significant bit of the sum A + R where R is the complement of R and to select the direction of rotation in accordance with the value of said bit.

6. An automatic tool changing device for a machine tool having a machine frame and a headstock spindle comprising:
a rotatable tool holding drum for holding a plurality of tools, said drum being rotatably selectively for bringing a selected tool in correspondence with said headstock spindle for engagement thereby,
a reversible electric motor for driving said drum in rotation,
an electromagnetic brake operable for braking said drum when said selected tool is so brought in correspondence with said headstock spindle,
a plurality of micro-switches for providing a binary coded number A representing the actual positions of said drum,
a plurality of sets of cams, each of said sets being mounted on said drum in association with one of said tool positions and operating a corresponding combination of said micro-switches when said tool position is presented to said headstock spindle,
an input register for storing a binary coded number R representing the required position of said drum, an inverter means for forming the complement $\overline{R}$ from said R number,
an adder responsive to said micro-switches and said inverter means to provide the most significant bit of the sum A+$\overline{R}$, two bistable elements which when set cause said electric motor to rotate in its two directions respectively, and a third bistable element which when set by a signal of assent to rotation of said drum releases said electromagnetic brake and enables said most significant bit to set one of said two elements depending upon whether said bit is "0" or "1,"
a comparison circuit connected to said input register and said micro-switches, said comparison circuit emitting a coincidence signal when A=R, said coincidence signal resetting all three of said elements,
a cam-operated switch arranged to provide an aligning signal when said drum is positioned to align said selected tool within a predetermined angular range relative to said headstock spindle,
and a further circuit responsive to said aligning signal and said coincidence signal as delayed by a delay circuit to provide an enabling signal allowing movement of said drum laterally toward said spindle.

7. A device according to claim 6 wherein said comparison circuit is connected to an arresting circuit which is additionally responsive to said assent signal as delayed by a delay circuit to reset all three of said elements if said coincidence signal does not appear prior to the appearance of said delayed assent signal.

8. A device according to claim 7 wherein the delay provided by said delay circuit corresponds to the time taken by said electric motor to rotate said drum through 10 of said tool positions.

* * * * *